United States Patent
Chen et al.

[11] Patent Number: 6,151,226
[45] Date of Patent: Nov. 21, 2000

[54] FOUR QUADRANT POWER CONVERSION TOPOLOGY

[75] Inventors: William I. H. Chen, Bedford; Edwin Glenn Yancey, Burleson; Mahlon Danny Kimbrough, Bedford, all of Tex.

[73] Assignee: Marconi Communications, Inc., Cleveland, Ohio

[21] Appl. No.: 09/305,637

[22] Filed: May 5, 1999

[51] Int. Cl.[7] ......................... H02M 3/335; H02M 7/538
[52] U.S. Cl. ................... 363/26; 363/25; 363/133
[58] Field of Search .................. 363/26, 25, 21, 363/19, 55, 56, 97, 41, 133; 323/207, 247; 327/105

[56] References Cited

U.S. PATENT DOCUMENTS

| | | | |
|---|---|---|---|
| 3,896,395 | 7/1975 | Cox | 327/105 |
| 5,109,185 | 4/1992 | Ball | 323/207 |
| 5,946,202 | 8/1999 | Balogh | 363/26 |

*Primary Examiner*—Peter S. Wong
*Assistant Examiner*—Rajnikani B. Patel
*Attorney, Agent, or Firm*—Jones, Day, Reavis & Pogue

[57] ABSTRACT

A four quadrant power conversion topology comprising a multi-winding inductor, four switches, and four diodes is disclosed. The four quadrant power conversion is utilized in a number of power conversion devices such as a power efficient non-linear power amplifier that comprises the 4Q power conversion topology of the present invention and a switch-control-signal generator coupled to the 4Q power conversion topology. The switch-control-signal generator generates switch activation signals for driving the four switches of the 4Q power conversion topology. In one embodiment the switch-control-signal generator comprises a polarity detector for detecting the polarity of an input signal, a full wave rectifier for rectifying the input signal, a pulse width modulator which produces a pulse width modulated signal representative of the full wave rectified input signal, and steering logic that generates switch activation signals for driving the power conversion topology to produce an output representative of the input signal. The amplifier may optionally include switch drivers to condition the switch activation signals to drive the switches in the 4Q power conversion topology.

52 Claims, 8 Drawing Sheets

FOUR QUADRANT POWER CONVERSION TOPOLOGY

BACKGROUND OF THE INVENTION

The present invention is directed toward the field of power conversion systems. In particular, the invention is directed to a four quadrant power conversion topology which is especially suited for use with remotely powered devices having non-linear reactive loads.

Remotely powered devices are devices that are provided power from a power source located some distance away through the use of power transmission wires. One type of remotely powered electronic device is known as an optical network unit ("ONU"). An ONU functions within a system known as a Fiber-In-The-Loop ("FITL") system.

An ONU is a device within a FITL system that is used as an interface between fiber optic telecommunication lines and traditional wires used to provide telecommunication services such as cable television and telephonic services to homes or other buildings. The ONU has a power supply that typically includes: (i) input protection and filter circuitry; (ii) energy storage circuitry, (iii) input voltage monitors and threshold circuitry, (iv) D.C. to D.C. power converters; (v) ringing generators; and (vi) alarm and digital interface circuitry.

A FITL system includes a host digital terminal ("HDT"), which is connected to a central switching office via fiber optic lines, and a plurality of ONUs, which are connected to the HDT via fiber optic lines. The HDT provides telecommunication service access for the connected ONUs and power transmission wires for delivering power from the HDT, which has access to AC power, to the ONUs, which do not have access to AC line power. The power source within the FITL system is typically a 140V power source with a source resistance of 10 to 200 Ohms. At the remotely located ONU, the input voltage delivered by the power transmission wires is generally in the range of 70V to 140V, and can vary dynamically depending on the load on the system.

The power transmission wires used to supply power to an ONU are typically thin telephone wires. Because of the resistance in the thin telephone wires, the peak deliverable power to the ONU is extremely limited. To ensure that the power transmission wires are capable of delivering sufficient power, it is desirable to maximize the power conversion efficiency.

The ONU, like many other remotely powered devices, includes systems that are only intermittently active, but require substantial power when active. An exemplary system is the ringing generator within the ONU. The ringing generator must generate a 5 to 10 Watt low frequency alerting signal for ringing telephone sets that are connected to the ONU. To minimize the ONU's peak power requirement, the ringing signal must be generated in a power efficient manner.

The ringing waveform is typically a low frequency sinewave, in the 16.5 hz to 50 hz range. The electromechanical (ringer) load is nonlinear and reactive. Thus, the load current waveform is often not the same as the voltage waveform. Specifically, the current waveform may have zero-crossings at times different from the voltage waveform's zero-crossings. Moreover, the instantaneous current polarity may be independent of the instantaneous voltage polarity. Consequently, the ringing generator must be able to generate a bipolar sinewave voltage output while accommodating load current in either polarity.

This characteristic is commonly referred to as Four-Quadrant ("4Q") output capability. Within each cycle of the sinusoidal ringing waveform, the instantaneous power alternates in direction. The instantaneous power flow is toward the load when the output voltage and current have the same polarity. The power flow is toward the source (ringing generator) when the output voltage and current are of opposite polarity.

Previous generations of ringing generators provide 4Q output capability by using linear amplifiers or buck converters as output stages. Both of these output stages require a steady +/−100V supply voltages that are derived from the raw power source through power converters.

The theoretical maximum efficiency of a linear amplifier for a sinewave output is 2/Pi=63.7%. Taking into account the efficiency of supply converters, the overall efficiency falls somewhere between 50% and 60%.

The buck converter output stage can be designed to convert power in both directions and is thus more efficient than a linear power amplifier. But the double power conversion, from raw power to the regulated power supply rails for the buck converter and then the power conversion in the buck converter itself, incurs double conversion penalties. The power efficiency of such an arrangement typically falls between 60% to 76%.

Further, because the power transmission wires can be up to 6000 ft. long, the input power may have considerable common-mode components due to induction from the power wires. As a result, the input and output circuits must have galvanic isolation for typically 1500 V.

Therefore, there remains a need in this art for a 4Q power conversion topology with increased power efficiency. There remains a more particular need for a 4Q power conversion topology that has high galvanic isolation. Further, there remains a need in this art for a 4Q power conversion topology that can be implemented in remotely powered devices and can limit the remotely powered device's peak power demands.

SUMMARY OF THE INVENTION

The present invention overcomes the problems noted above and satisfies the needs in this field for a four quadrant ("4Q") power conversion topology having greater power efficiency and high galvanic isolation. The topology of the present invention can be incorporated into many power devices requiring four quadrant power delivery capabilities such as non-linear power amplifiers, linear power amplifiers, ringing generators and other power devices. The 4Q power conversion topology utilizes a single conversion process and, as a result, incurs the inefficiencies of only a single power conversion. Consequently, the 4Q power conversion topology of the present invention is capable of better than 85% efficiency.

The present invention provides many advantages over the presently known 4Q power conversion topologies. Not all of these advantages are simultaneously required to practice the invention as claimed, and the following list is merely illustrative of the types of benefits that may be provided, alone or in combination, by the present invention. These advantages include: (1) increased power efficiency; (2) lower peak current demands; (3) galvanic isolation; (4) frequency modulated operation that adjusts the power supplying capability to meet power demands for increased efficiency; and (5) digital control capability.

In accordance with the present invention, a 4Q power conversion topology is provided that comprises a multi-winding inductor, four switches, each switch having a diode, and an output capacitive device for accomplishing the 4Q power conversion.

A power efficient non-linear power amplifier having 4Q power supplying capability is provided that comprises the 4Q power conversion topology of the present invention and a switch-control-signal generator coupled to the 4Q power conversion topology. The switch-control-signal generator generates switch activation signals for driving the four switches of the 4Q power conversion topology. In one embodiment the switch-control-signal generator comprises a polarity detector for detecting the polarity of an input signal, a full wave rectifier for rectifying the input signal, a pulse width modulator which produces a pulse width modulated signal representative of the full wave rectified input signal, and steering logic that generates switch activation signals for driving the power conversion topology to produce an output representative of the input signal. The amplifier may optionally include switch drivers to condition the switch activation signals to drive the switches in the 4Q power conversion topology.

In accordance with the present invention, a power efficient linear power amplifier having 4Q power supplying capability is also provided. The linear power amplifier comprises the non-linear power amplifier of this invention with appropriate feedback to linearize the amplification process.

Also provided is a power efficient signal generator having 4Q power supplying capability. In accordance with the present invention, the signal generator comprises a waveform to be amplified and either the linear or non-linear amplifier disclosed herein.

Alternately, a power efficient signal generator is provided comprising a digital synthesizer that synthesizes the appropriate switch activation signals to cause the 4Q power conversion topology to generate the desired output signal.

BRIEF DESCRIPTION OF THE DRAWINGS

The present invention will become more apparent from the following description when read in conjunction with the accompanying drawings wherein:

FIG. 4a is a simplified schematic of a preferred embodiment of the 4Q power conversion topology in a second mode of operation wherein;

FIG. 4b is an alternate view of the simplified schematic shown in FIG. 4a;

FIG. 10b is a continuation of FIG. 10a; and

DETAILED DESCRIPTION OF THE PREFERRED EMBODIMENT

Figure 1:
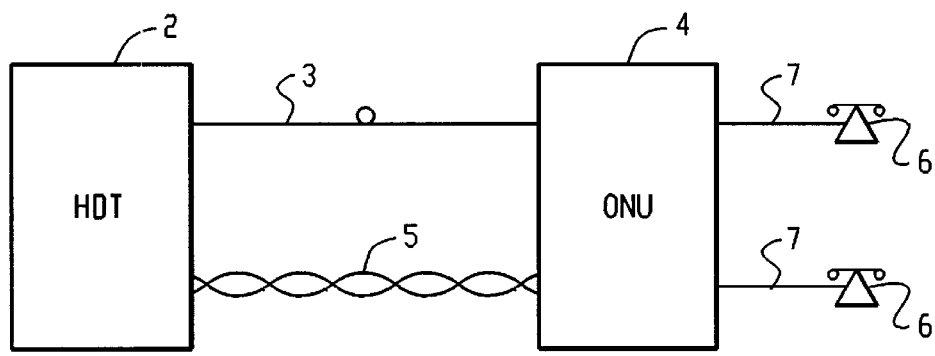
FIG. 1 sets forth a block diagram of a Fiber-In-The-loop (FITL) system that includes the present invention.

Referring now to the drawings, FIG. 1 sets forth a Fiber-In-The-loop 1 (FITL) system that includes a host digital terminal 2 ("HDT"), which is connected to a central switching office (not shown) via fiber optic lines (not shown), and an Optical Network Unit 4 ("ONU"), which is connected to the HDT 2 via fiber optic lines 3. The HDT 2 provides telecommunication service access for the connected ONU 4 and power transmission wires 5 for delivering power from the HDT 2, which has access to AC power, to the ONU 4, which does not have access to AC line power.

The ONU 4 is an interface between fiber optic telecommunication lines and traditional wires used to provide telecommunication services such as cable television and telephonic services to homes or other buildings. In the embodiment shown, the ONU 4 is coupled to telephone(s) 6 via traditional telephone wires 7. In addition to coupling signals traveling on the telephone wires 7 to signals on the fiber optic lines 3, the ONU 4 must also provide, among other things, a ringing signal to the telephones 6 at appropriate times. The ringing signal is generated by a ringing generator (not shown) that is contained within a power supply (not shown) that is included in the ONU 4. The ringing generator is constructed using the four quadrant ("4Q") power conversion topology of the present invention. The ringing generator must generate a 5 to 10 Watt low frequency alerting signal for ringing telephone sets 6 that are connected to the ONU 4. To minimize the ONU's 4 peak power requirement, the ringing signal must be generated in a power efficient manner.

The ringing waveform is typically a low frequency sinewave, in the 16.5 hz to 50 hz range. The electromechanical (ringer) load is nonlinear and reactive. Thus, the load current waveform is often not the same as the voltage waveform. Specifically, the current waveform may have zero-crossings at times different from the voltage waveform's zero-crossings. Moreover, the instantaneous current polarity may be independent of the instantaneous voltage polarity. Consequently, the ringing generator must be able to generate a bipolar sinewave voltage output while accommodating load current in either polarity.

This characteristic is commonly referred to as Four-Quadrant (4Q) output capability. Within each cycle of the sinusoidal ringing waveform, the instantaneous power alternates in direction. The instantaneous power flow is toward the load when the output voltage and current have the same polarity. The power flow is toward the source (ringing generator) when the output voltage and current are of opposite polarity.

Figure 2:
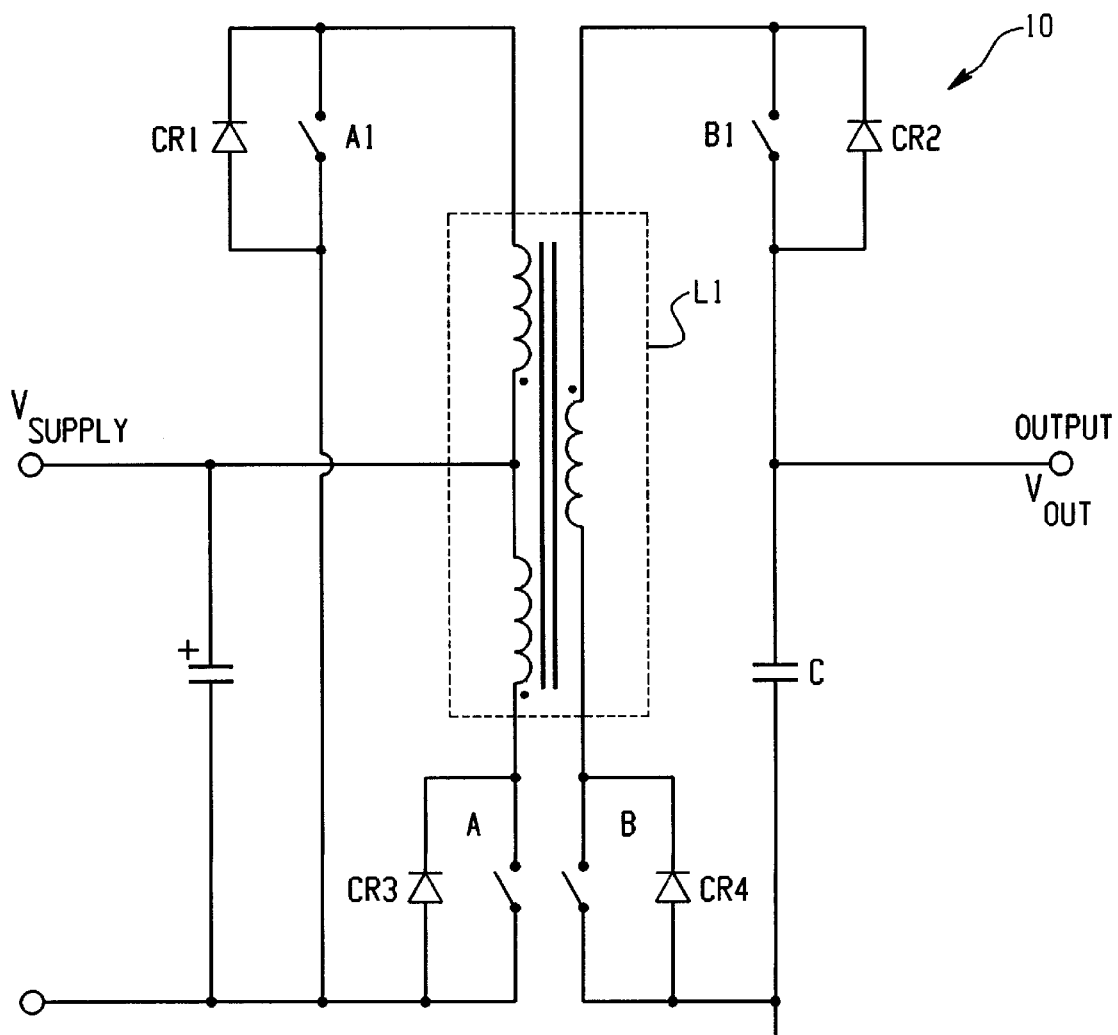
FIG. 2 is a simplified schematic of a preferred embodiment of the 4Q power conversion topology.

Now referring to FIG. 2, a simplified schematic of a preferred embodiment of a 4Q power conversion topology 10 is shown. The power conversion topology 10 requires a supply voltage $V_{supply}$ and outputs a bipolar output voltage $V_{out}$. The power conversion topology 10 includes a multi-winding inductor L1 having, in the preferred embodiment, inductor winding ratios of 1:1:N. The supply voltage $V_{supply}$ is positive in this embodiment. The power conversion topology 10 also preferably includes four switches A, B, A1, and B1, four diodes CR1, CR2, CR3, and CR4, and an output capacitor C.

In one mode of operation of the topology 10, the switch A1 is open and the switch B1 is closed. In this mode, the diode CR1 is back-biased and not conducting (this assumption can be satisfied with proper design of turns ratio in the multi-winding inductor L1 such that the induced voltage from the secondary winding to the primary winding does not forward bias the diode). The resulting circuit is shown in FIG. 3.

Figure 3:
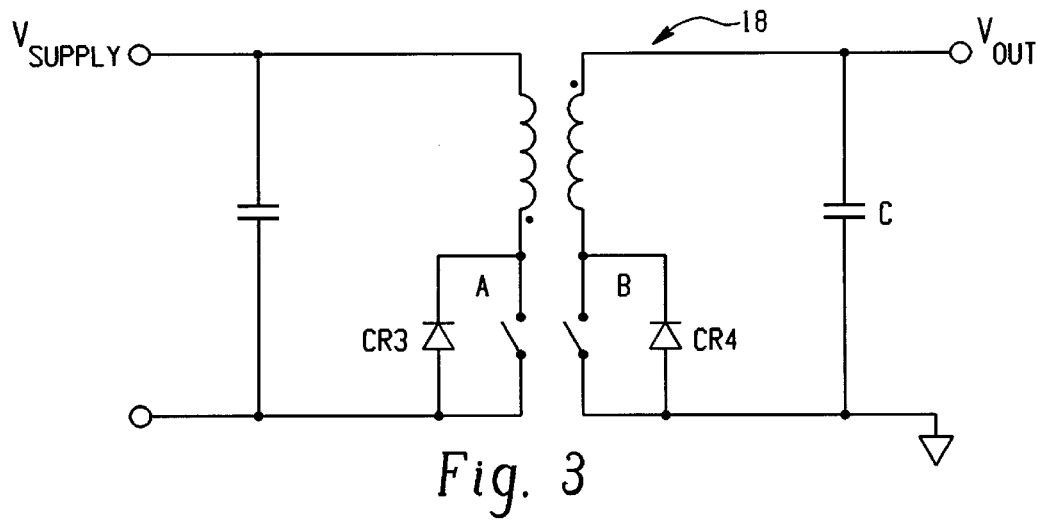
FIG. 3 is a simplified schematic of a preferred embodiment of the 4Q power conversion topology in a first mode of operation.

The topology 10 in this mode of operation reduces to that of a flyback converter 18 as shown in FIG. 3. The converter 18 in this operating mode produces an output voltage $V_{out}$ that is always positive. Switches A and B are driven as synchronous-rectifiers, i.e., either switch A or switch B is on at any given time, and, as a result, the converter 18 is forced into a continuous-current mode at all times. The output voltage $V_{out}$ is a function of both the supply voltage $V_{supply}$) and the duty cycle of the switches A and B where:

$V_{out} = V_{supply} * [D/(1-D)] * N$, where D is the fraction of the switching cycle when switch A is conducting and (1−D) is the fraction of the switching cycle when switch B is conducting.

Because the converter 18 is operated as a continuous-current mode converter, the output voltage $V_{out}$ is independent of the magnitude or the direction of the output current. The converter 18, therefore, can produce a bi-directional output current with an output voltage $V_{out}$ having a positive amplitude only. The converter 18 is not capable of producing a negative output voltage $V_{out}$.

Figure 4A:
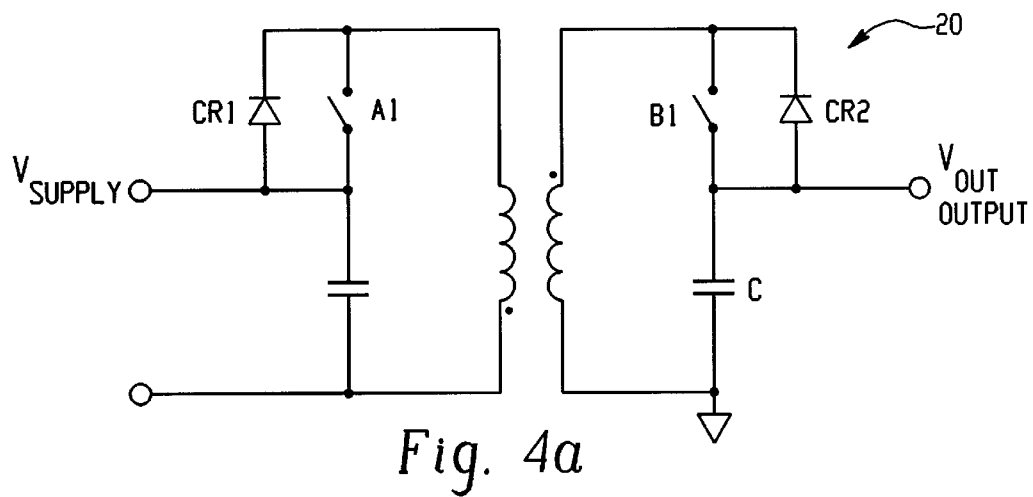
Figure 4B:
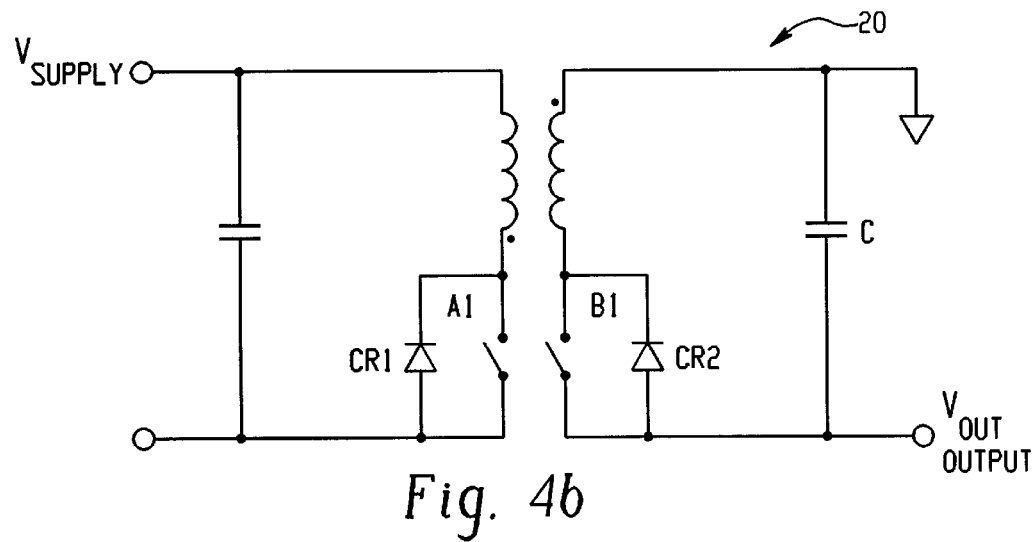

Referring back to FIG. 2, in another mode of operation the switch A is open and the switch B is closed. In this operating mode, the diode CR3 is back-biased and not conducting (this assumption can be satisfied with proper design of turns ratio in the multi-winding inductor L1). The resulting circuit is shown in FIG. 4a, which is redrawn as FIG. 4b.

The topology 10 in this mode of operation reduces to that of a flyback converter 20 that only produces negative output voltages $V_{out}$. Switches A1 and B1 are driven as synchronous-rectifiers, i.e., either switch A1 or switch B1 is on at any given time, and, as a result, the circuit is forced into a continuous-current mode at all times. The output voltage Vout is a function of both the supply voltage $V_{supply}$ and the duty cycle of the switches A and B where:

$V_{out} = (-1) * V_{supply} * [D/(1-D)] * N$, where D is the fraction of the switching cycle when switch A1 is conducting and (1−D) is the fraction of the switching cycle when switch B1 is conducting.

Because the converter 20 is operated in the continuous-current mode, the converter output voltage $V_{out}$ is independent of the magnitude or the direction of the output current. The converter 20, therefore, can produce a bi-directional output current with an output voltage $V_{out}$ having a negative amplitude only. The converter 20 is not capable of producing a positive output voltage $V_{out}$.

Through proper on/off sequencing of the switches A, B, A1 and B1, the topology 10 has 4Q output capability.

In summary, the 4Q power conversion topology 10 shown in FIG. 2 has the following features:

a. The continuous-current mode converter 10 is capable of bi-directional output currents;

b. To produce positive output voltage, switch A1 is opened, switch B1 is closed, and switches A and B are driven as synchronous rectifiers;

c. To produce negative output voltage, switch A is opened, switch B is closed, and switches A1 and B1 are driven as synchronous rectifiers;

d. The magnitude of the output voltage $V_{out}$ is a linear function of the supply voltage $V_{supply}$ and is a non-linear function of switch duty cycle D; and The multi-winding inductor L1 provides a level of galvanic isolation between the input and the output.

The 4Q power conversion topology 10 of the present invention has many applications. For example the 4Q topology 10 can be used to construct a non-linear power amplifier 22 having four quadrant power amplification capability as shown in the block diagram of a non-linear power amplifier 22 utilizing the 4Q power conversion topology 10 of FIG. 5.

The non-linear power amplifier 22 amplifies an input signal $V_{sig}$ and produces an output signal $V_{out}$. The preferred non-linear power amplifier 22 comprises a switch-control-signal generator 23, switch drivers 32, and 4Q power conversion topology 10. The switch-control-signal generator 23, based on the input signal $V_{sig}$, synthesizes switch activation signals $A_{sig}$, $B^{sig}$, $A1_{sig}$, and $B1_{sig}$ that are used to control the switches A, B, A1, and B1 in the 4Q power conversion topology 10 to generate the output $V_{out}$.

The preferred switch-control-signal generator 23 comprises a polarity detector 24, a full wave rectifier 26, a pulse width modulator ("PWM") 28, and steering logic 30. In the preferred switch-control-signal generator 23, the polarity of the input signal waveform $V_{sig}$ is detected by the polarity detector 24 and is reported as a binary logic signal P wherein P=1 when the input signal $V_{sig}$ is positive and P=0 when the input signal $V_{sig}$ is negative. The input signal $V_{sig}$ is also fullwave rectified by the full wave rectifier 26. The unipolar rectified signal from rectifier 26 is used by the PWM 28 to produce a pair of pulse-width-modulated logic signals D and E.

Logic signals D and E are logical complementary waveforms with appropriate dead-time gaps for driving the synchronous rectifiers of power conversion topology 10. Stated differently, logic signal E is the logical complement of logic signal D with logic signal E's state transition occurring at a different time than logic signal D's state transition. Logic signal E falls to a low level before D rises to a high level and rises to a high level slightly after logic signal D falls to a low level.

The PWM 28 is a linear pulse width modulator with an output duty cycle $D=|V_{sig}|/V_{ref}$, where D=1 when $|V_{sig}|=V_{ref}$. $V_{ref}$ is the peak-to-peak amplitude value of the frequency signal that drives the PWM 28 in this embodiment.

The steering logic 30 uses the logic signals D and E and the polarity signal P signal to synthesize the switch activation signals $A_{sig}$, $B_{sig}$, $A1_{sig}$, and $B1_{sig}$ that drive the switch-pairs A–B and A1–B1. The steering logic equations are:

$$A_{sig} = (D \text{ AND } P); \quad (1)$$

$$B_{sig} = (E \text{ AND } P) \text{ OR } (/P); \quad (2)$$

$$A1_{sig} = (D \text{ AND } /P); \quad (3)$$

$$B1_{sig} = (E \text{ AND } /P) \text{ OR } (P). \quad (4)$$

The switch drivers 32, driven by the switch activation signals $A_{sig}$, $B_{sig}$, $A1_{sig}$ and $B1_{sig}$, perform the necessary signal conditioning to drive the power switches in power conversion topology 10. The 4Q power conversion topology 10 functions as described above to produce the output voltage $V_{out}$. The amplifier output voltage $V_{out}$ is:

$$V_{out} = [(-1)^{**}(P+1)] * [|V_{sig}|/(V_{ref} - |V_{sig}|)] * V_{supply} * N \quad (5)$$

$$= [(-1)^{**}(P+1)] * [D/(1-D)] * V_{supply} * N. \quad (6)$$

Figure 5:
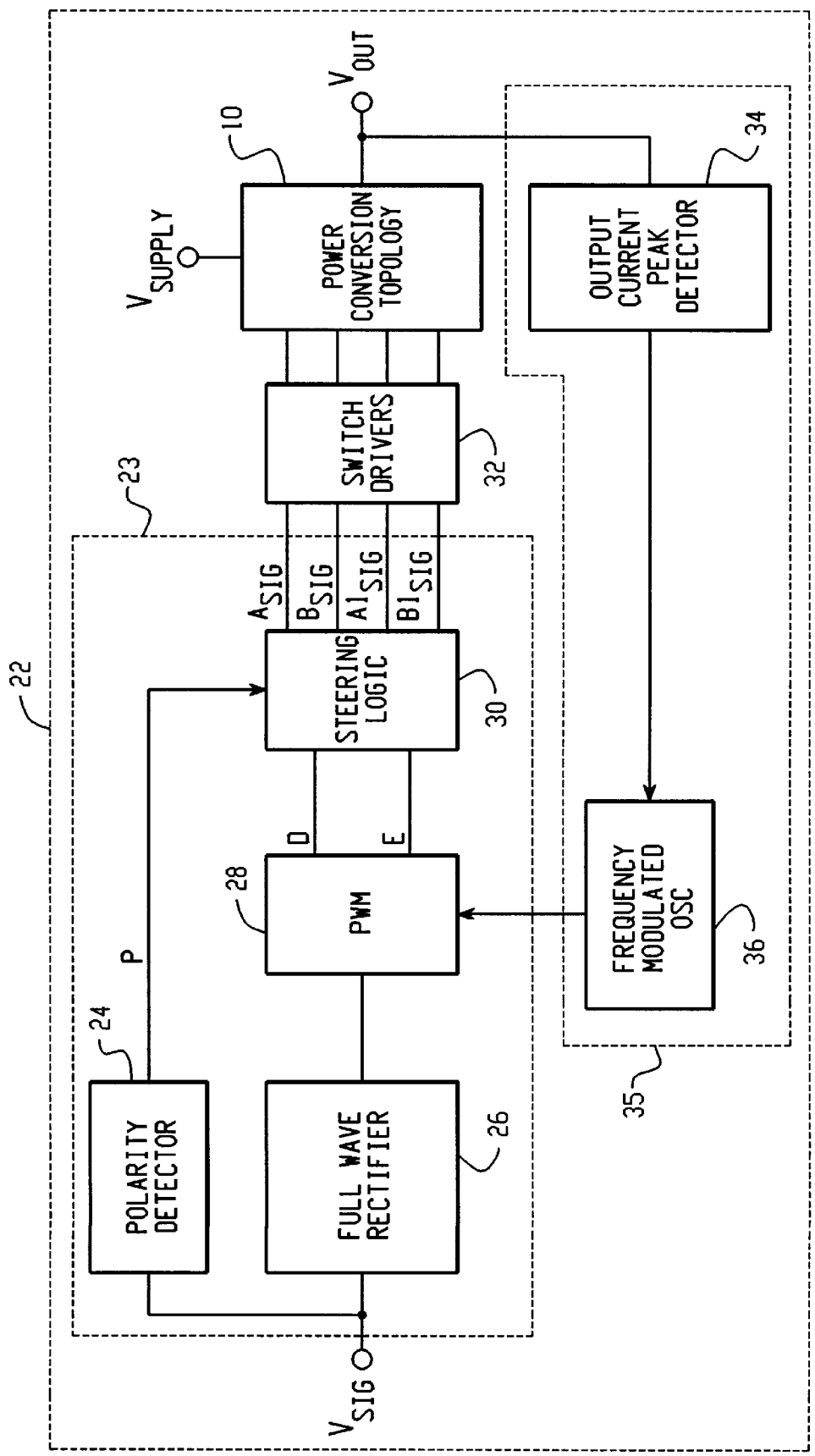
FIG. 5 is a block diagram of a non-linear power amplifier using the 4Q power conversion topology.

In summary, the non-linear power amplifier of FIG. 5 has the following features:

a) $V_{out}$ is a known, non-linear algebraic, function of $V_{sig}$;

b) $|V_{out}|$ is proportional to the supply voltage, $V_{supply}$;

c) If $V_{sig}$ has both DC and AC contents, then $V_{out}$ will also have both DC and AC contents; and d) The polarity of $V_{out}$ follows the polarity of $V_{sig}$.

An additional advantage of the preferred non-linear amplifier 22 of the present invention is a frequency modulation capability that allows the non-linear amplifier 22 to trade-off power efficiency with power supplying capability to meet dynamic load demands. The frequency modulator 35 performs the frequency modulation function.

The switching frequency F of the 4Q power conversion topology 10 effects the power supplying capability and the power conversion efficiency. A higher switching frequency F provides greater power supplying capability but at a lower power conversion efficiency level. Therefore, the switching frequency F of the 4Q power conversion topology 10 can be chosen to minimize the size of the multi-winding inductor L1 for maximum load conditions.

But, the switching frequency can be modulated according to load conditions to improve power efficiency. At nominal and light loads, efficiency and idle power can be improved by lowering the switching frequency F by a factor of about 2 to 5.

During the brief intervals, when the power output is at the overload design maximum such as the ring-trip interval, the converter can be operated at its maximum frequency, F. Power conversion efficiencies better than 76% have been achieved at this frequency. During normal and light loads, the converter can be operated at a lower frequency, F/3, for example. The power conversion efficiencies at this frequency F/3 have been observed at better than 87%.

To accomplish the frequency modulation, the preferred frequency modulator 35 uses a peak detector 34 and a frequency modulated oscillator 36. The peak detector 34 measures the current through the secondary of multi-winding inductor L1 and sends a signal to oscillator 36 based on the current detected. When the peak current is high, the oscillator 36 is caused to modulate at a higher frequency. During a low current state, the oscillator 36 is caused to modulate at a lower frequency.

Figure 6:
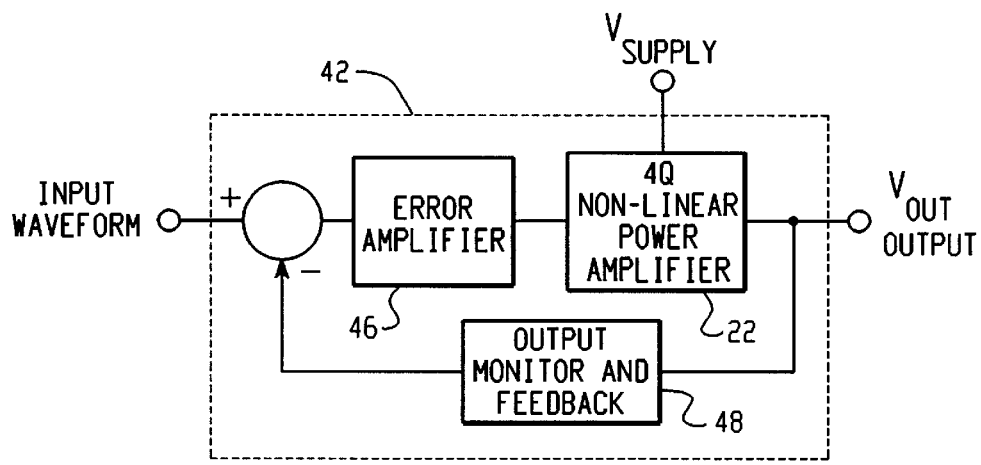
FIG. 6 is a block diagram of a linear power amplifier using the 4Q power conversion topology.
Figure 7:
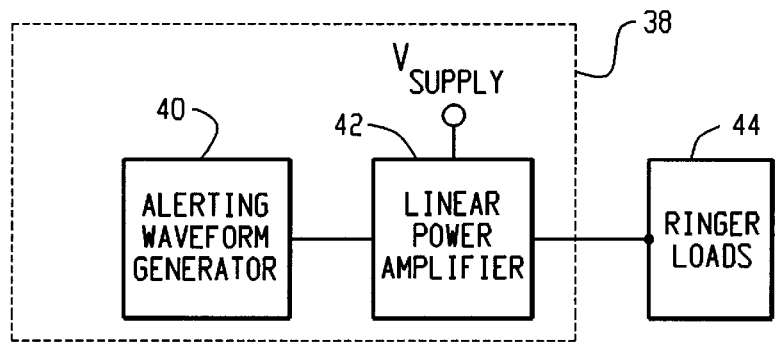
FIG. 7 is a block diagram of a ringing generator using the 4Q power conversion topology.

Now referring to FIGS. 6 and 7, a preferred linear power amplifier 42 and a preferred ringing generator 38 are shown. The general architecture of the preferred ringing generator 38 consists of a low power alerting-waveform generator 40 which drives a linear power amplifier 42. The linear power amplifier 42 in turn consists of a 4Q non-linear power amplifier 22 embedded in a feedback loop, as shown in FIG. 6.

The feedback loop linearizes the 4Q non-linear amplifier 22 and regulates the output waveform $V_{out}$ against both supply voltage $V_{supply}$ variations and output load variations. The theory of feedback control is well-known. One of ordinary skill in the art could use conventional design techniques to design an appropriate feedback loop that preferably incorporates an output monitor 48 and an error amplifier 46 in a feedback loop to linearize the non-linear amplifier 22 to form the linear amplifier 42. One of ordinary skill in the art could also adapt the ringing generator of the present invention to other applications such as a shake table driver without departing from the spirit of the invention.

Another application for the 4Q power conversion topology 10 of the present invention is in the direct synthesis of a ringing generator signal without amplifying a reference input signal. As shown in Eq (6), the output voltage $V_{out}$ can be expressed as a function of four variables: D, P, N and $V_{supply}$. The polarity signal P and the duty cycle signal D required to generate the desired output voltage $V_{out}$ can be synthesized directly because the supply voltage $V_{supply}$ is known by measurements and the inductor turns ratio N is known by design which leads to the following equations:

$$P = (\tfrac{1}{2})*(1+V_{out}/|V_{out}|), P=[1,0]. \quad (7)$$

$$D = |V_{out}|/[(N*V_{supply})+|V_{out}|], 0 \leq D \leq 1. \quad (8)$$

Equations (1)–(4) can be used to translate signals P and D into switch drive logic signals A, B, A1 and B1. As noted before, E, in Eq (2) and Eq (4), is the logical complement of D with appropriate dead-time gaps for driving synchronous rectifiers.

Figure 8:
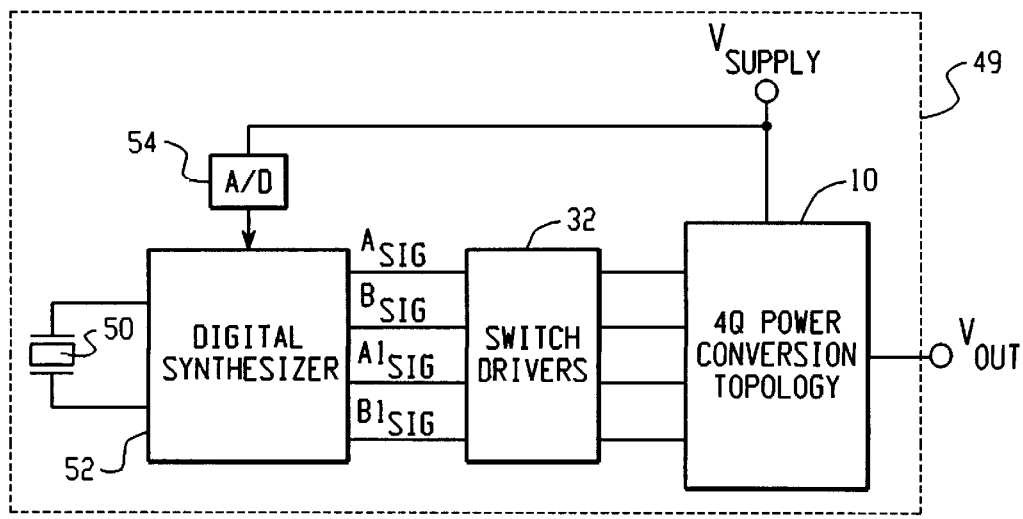
FIG. 8 is a block diagram of an open loop direct synthesis signal generator using the 4Q power conversion topology.

FIG. 8 shows an arrangement for an open loop direct synthesis high power signal generator 49. A crystal 50 provides a clock and frequency reference for a digital synthesizer 52. The digital synthesizer 52 can be designed to generate the desired signals A, B, A1 and B1. The switch drivers 32 and power conversion topology 10 are the same as those described with reference to the non-linear power amp 22 of FIG. 5. The supply voltage $V_{supply}$ is measured by the A/D converter 54 to account for any variance in the supply voltage $V_{supply}$.

Optionally, the signal generator 49 can be provided with a frequency modulator to improve the power efficiency during non-peak load conditions. The frequency modulator could be constructed using direct logic synthesis or externally through a frequency modulated oscillator in place of crystal 50 or by other methods.

One advantage of this system is that the desired output voltage $V_{out}$ can be generated without having to detect the polarity of any signal or without having to full-wave rectify any signal. As a result, crossover distortions at zero crossings due to sensing errors are eliminated. Another advantage is that the signal generator 49 can be adapted to many different applications such as a ringing generator, shake table driver, and others.

Figure 9:
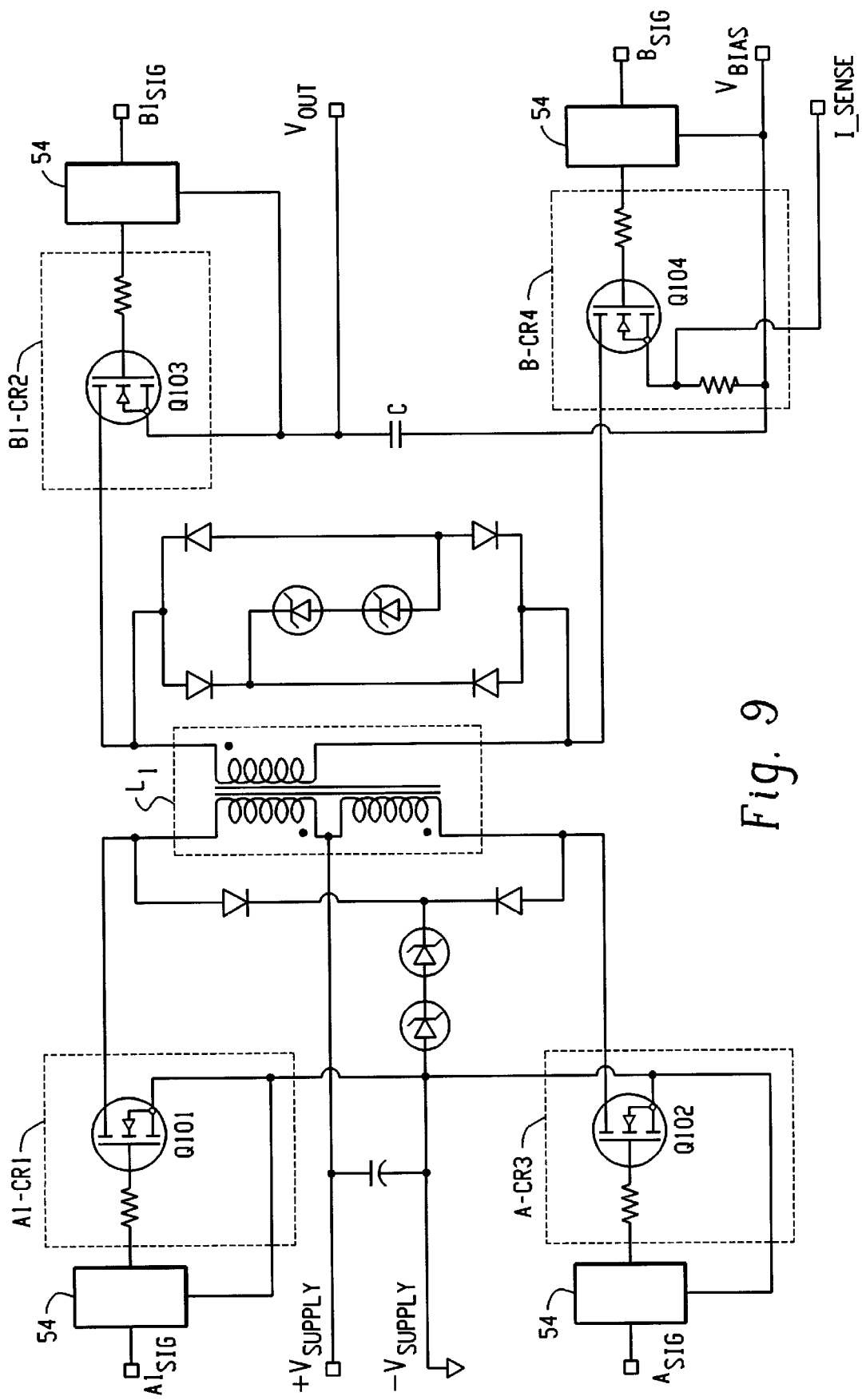
FIG. 9 is a schematic diagram of a preferred embodiment of the 4Q power conversion topology.
Figure 10A:
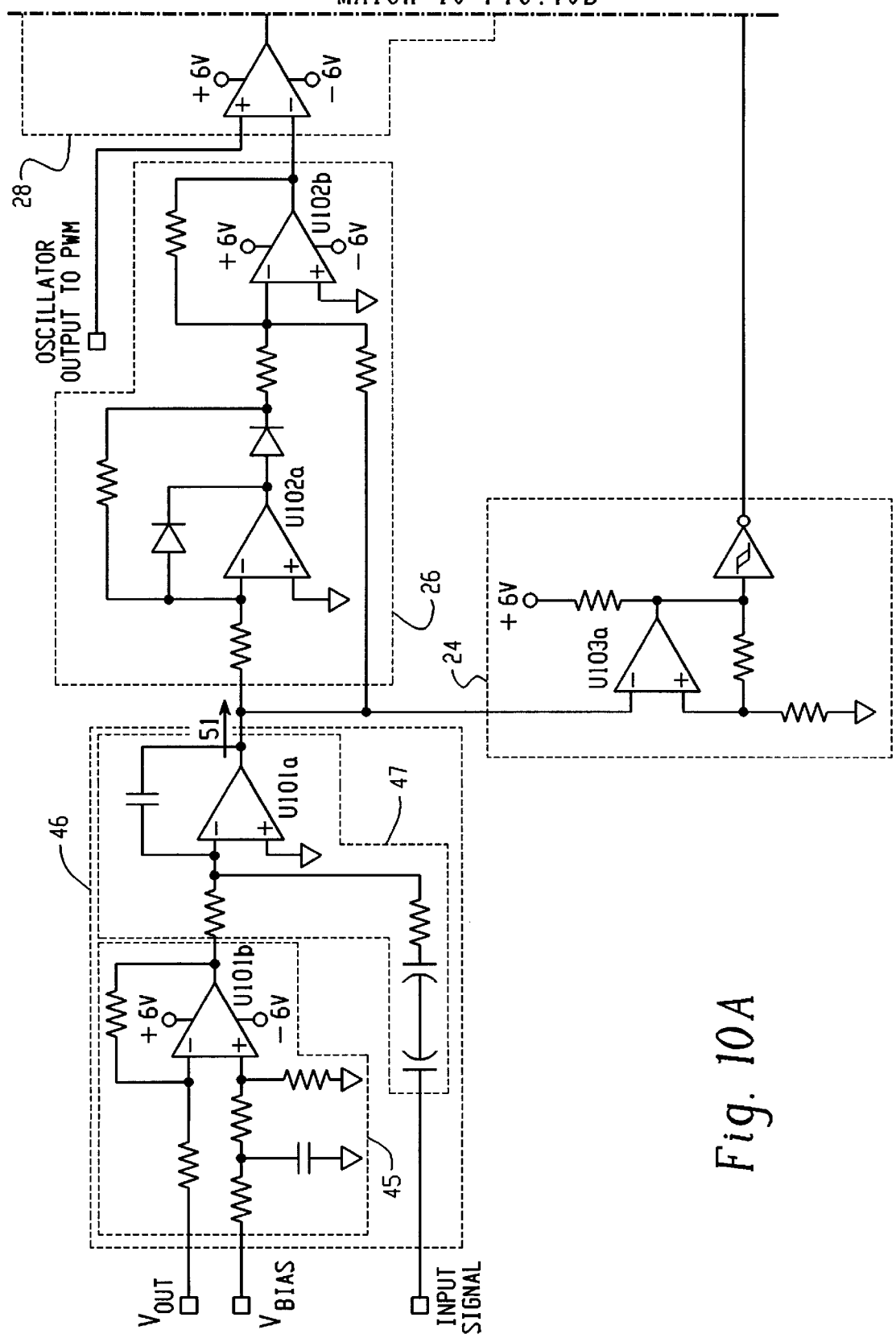
FIG. 10a is a schematic diagram of a preferred embodiment of the switch-control-signal generator using the 4Q power conversion topology.
Figure 10B:
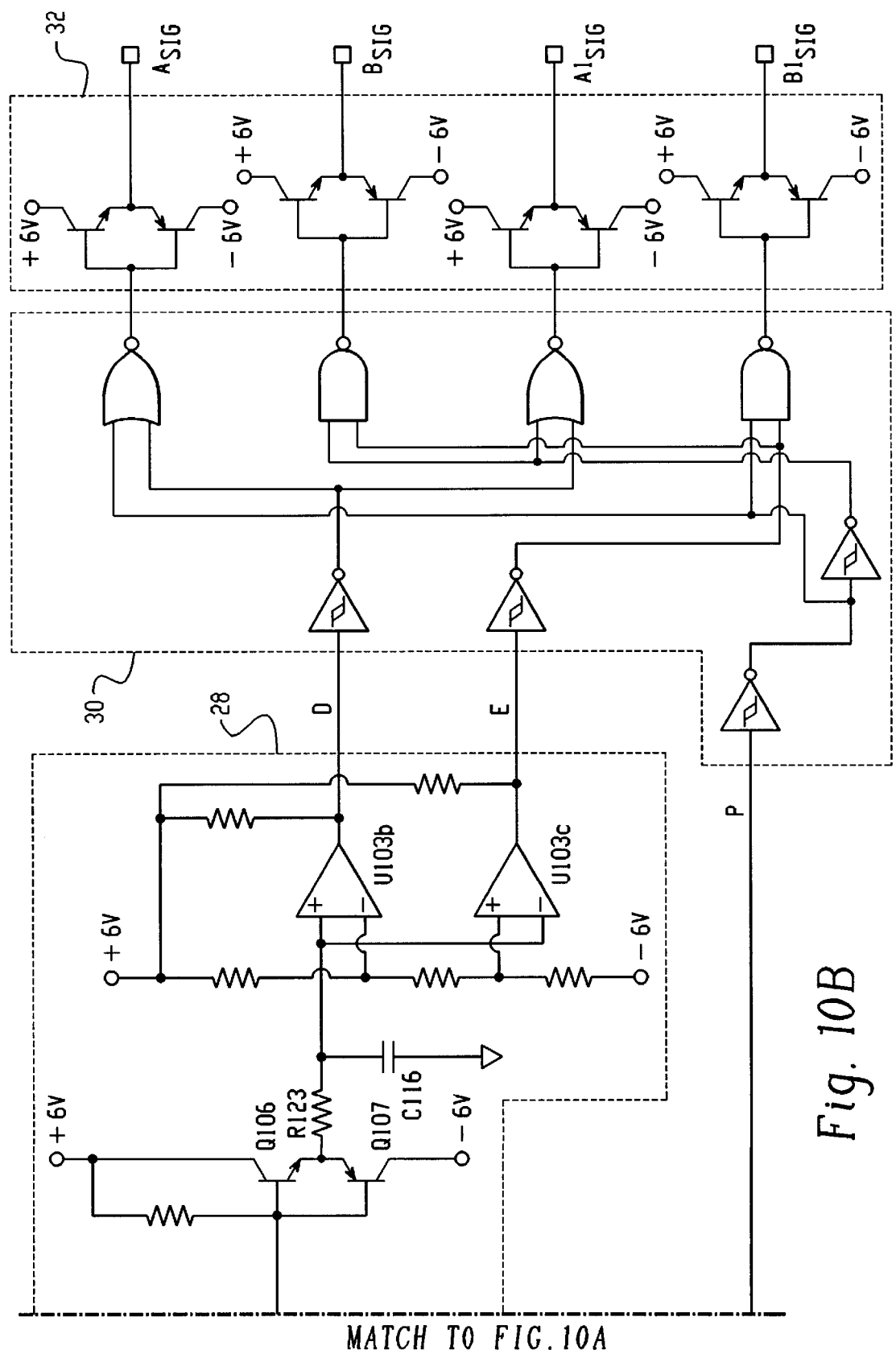
Figure 11:
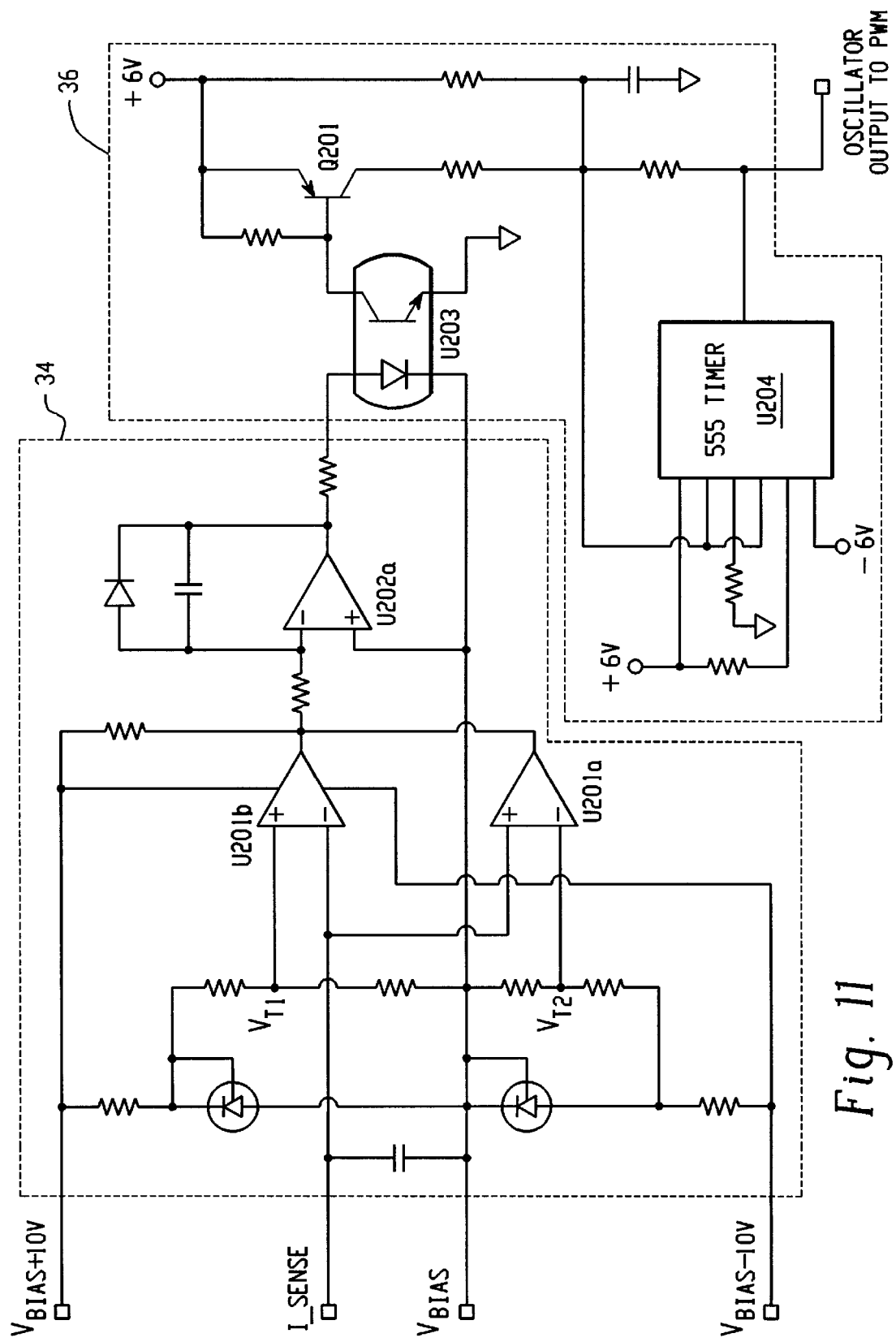
FIG. 11 is a schematic diagram of a preferred embodiment of the frequency modulator.

FIGS. 9–11 show a detailed arrangement of a preferred embodiment of the linear power amp 42 of FIG. 6. The switch and diode pairs A1-CR1, B1-CR2, A-CR3 and B-CR4 of 4Q power converter 10 are implemented using IRF712 MOSFETs Q101, Q102, Q103, and Q104, respectively, which include a built-in diode between the substrate and source. Separate diodes CR1, CR2, CR3, and CR4 are not required if the switches A1, B1, A, and B include built-in diodes. Other devices could be used as switches A1, B1, A, and B, such as bipolar transistors, IGBTs, vacuum tubes, mechanical switches and relays, optical relays, light sensitive switches as well as other devices without departing from the spirit of the invention.

The 4Q power converter 10 also includes level shifting circuits 54 which function as interfaces between the switches A1, B1, A and B and the respective switch activation signals $A1_{sig}$, $B1_{sig}$, $A_{sig}$, and $B_{sig}$. The level shifting circuits 54 may be needed because the circuits generating the switch activation signals may be referenced to a ground that is different from the 4Q power converter's primary or secondary ground references. Thus, the switch actuation signals are level shifted by level shifting circuits 54 so that the switches can properly respond to the switch actuation signals. Level shifting circuits 54 could comprise transformers or other elements to accomplish the level shifting function.

The preferred 4Q power converter 10 is also provided with a bias voltage $V_{Bias}$ which is commonly used in telephonic applications. The secondary side's ground reference in the preferred 4Q power converter 10 is referenced to the bias voltage $V_{Bias}$. Consequently, the output $V_{out}$ of the preferred 4Q power converter 10 is biased above the bias voltage $V_{Bias}$.

With reference to FIGS. 10a and 10b, the input signal for the linear power amp 42 is fed to both the polarity detector 24 and the full wave rectifier 26. The preferred polarity detector 24 has been implemented using a comparator U103a and the preferred full-wave rectifier 26 has been implemented using a standard op-amp full-wave rectifier circuit. The full-wave rectifier 26 comprises op-amps U102a and U102b which in combination with other circuit elements perform the full wave rectification function.

The output of the full wave rectifier 26 is fed to the pulse width modulator 28. The PWM 28 compares, via comparator U103d, the full wave rectifier 26 output with a switching-frequency sawtooth waveform generated by the oscillator 36. The output of the comparator U103d is squared by the transistors Q106 and Q107 and rounded by the RC network R123-C116. The output of the RC network R123-C116 is then converted to the signals D and E by the comparators U103b and U103c, respectively. The comparators U103b and U103c provide for dead time control by generating the signals D and E such that the signal E transitions to a low state just before the signal D transitions to a high state and returns to a high state shortly after signal D returns to a low state.

The signals D and E are then routed to the steering logic 30 along with the polarity signal P. The preferred steering logic 30 implements equations 1–4 using logic gates to synthesize switch activation signals $A_{sig}$, $B_{sig}$, $A1_{sig}$, and $B1_{sig}$. Any number of combinations of elements such as logic gates, transistors, memory units, programmable logic devices, or other devices could be used to perform the function without departing from the spirit of the invention.

Switch activation signals $A_{sig}$, $B_{sig}$, $A1_{sig}$, and $B1_{sig}$ are then passed to switch driver 32 which amplifies the signals $A_{sig}$, $B_{sig}$, $A1_{sig}$, and $B1_{sig}$ so that these signals can drive the switches A, B, A1, and B1 in the 4Q power converter 10. The preferred switch driver 32 comprises a separate class B push-pull amplifier stage for each switch activation signal $A_{sig}$, $B_{sig}$, $A1_{sig}$, and $B1_{sig}$. The switch driver 32, however, could comprise many different devices such as power BJTs, power MOSFETS, power ICs and others without departing from the spirit of the invention.

The preferred linear power amp 42 also includes an error amp 46 for linearizing the output $V_{out}$. The preferred error amp 46 comprises a dc error amp 45 and an ac error amp 47. The dc error amp includes an op amp U101b that subtracts away the dc component from the output $V_{out}$, namely $V_{Bias}$. The ac error amp includes an op amp U101a which compares the ac portion of the output $V_{out}$ with the ac portion of the input signal. The ac error amp generates an error signal 51 which is fed to the full wave rectifier 26 and the polarity detector 24. If the ac portion of the output $V_{out}$ is the same as the input signal then the error signal 51 is equal to the input signal. If there is a difference, then the error signal 51 is adjusted so that the linear power amp 42 produces an output $V_{out}$ with the error eliminated.

FIG. 11 shows a detailed arrangement of the preferred frequency modulator 35 with a preferred frequency modulated oscillator 36 and output current peak detector 34. The preferred output peak detector 34 is provided with an input voltage I_sense that is proportional to the current flowing through the secondary of the multi-winding inductor L1. Two comparators U201a and U201b compare the I_sense voltage to separate threshold reference voltages $V_{T1}$ and $V_{T2}$. If the current flow as measured by the I_sense voltage is more positive than a first threshold level, then the comparator U201a will output a low voltage signal. If the current flow as measured by the I_sense voltage is more negative than a second threshold level, then comparator U201b will output a low voltage signal. If the current flow is between the two threshold levels, then neither comparator will output a low voltage signal and the voltage input to op amp U202a will be at a high level. Op amp U202a is configured as an integrator that outputs a current that drives the frequency modulator oscillator 36. The output current peak detector 34 is a fast attack, slow decay detector. When it senses high current flow via a high voltage the voltage I_sense, the peak detector 34 quickly outputs a high current through op amp U202a. The current gradually reduces if the current flow through the multi-winding inductor secondary returns to a low level as measured by the voltage I_sense.

The preferred frequency modulated oscillator 36 comprises an opto-isolator U203, a transistor Q201 and a 555 timer U204. The frequency output by the 555 timer U204 is used by the PWM 28. The frequency is varied by the current flowing through the transistor Q201. The current flowing through the transistor Q201 is determined by the current flowing through the opto-isolator U203. A higher current flow through the opto-isolator U203 will result in a higher current flow through the transistor Q201 which in turn will result in a higher frequency output by the 555 timer U204. The current flow through the opto-isolator U203 will be high when the current flow through op-amp U202a is high which in turn occurs when the current flow through the secondary of the multi-winding inductor L1 is high. Thus, the 555 timer U204 will output a higher frequency when the current flow through the secondary of multi-winding inductor L1 is high.

Having described in detail the preferred embodiments of the present invention, including preferred modes of operation, it is to be understood that this operation could be carried out with different elements and steps. The preferred embodiments are presented only by way of example and are not meant to limit the scope of the present invention which is defined by the following claims.

What is claimed is:

1. A power conversion topology having four quadrant power supplying capability comprising:

(a) a multi-winding inductor having a primary side and a secondary side, said primary side being coupled to an input terminal having a supply end and a return end, said secondary side being coupled to an output capacitive device, said primary side having a first end, a center tap, and a second end, said secondary side having a first end and a second end;

(b) a first switch coupled between said return end of said input terminal and said first end of said primary side, said first switch including a first diode coupled across said first switch, said first diode having a cathode;

(c) a second switch coupled between said return end of said input terminal and said second end of said primary side, said second switch including a second diode coupled across said second switch, said second diode having a cathode;

(d) a third switch and a fourth switch coupled in a loop with said secondary side and said output capacitive device, said third switch including a third diode coupled across said third switch, said third diode having a cathode, said fourth switch including a fourth diode coupled across said fourth switch, said fourth diode having a cathode; and (e) whereby the topology is capable of bi-directional current output, the topology also being operable to alternatively generate a positive voltage a zero voltage level, or a negative voltage at said output capacitive device in response to the operation of a plurality of said switches.

2. The power conversion topology according to claim 1 wherein:
(a) said third switch is coupled between said first end of said secondary side and a first end of said output capacitive device, said third switch being operative to disconnect said first end of said secondary side from said first end of said output capacitive device when said third switch is in an open state; and
(b) said fourth switch is coupled between said second end of said secondary side and a second end of said output capacitive device, said fourth switch being operative to disconnect said second end of said secondary side from said second end of said output capacitive device when said fourth switch is in an open state.

3. The power conversion topology according to claim 1 wherein: said third switch and said fourth switch are coupled in series between said second end of said secondary side and said output capacitive device; said cathodes of said third and fourth switches are coupled in the direction of said second end of said secondary side; and whereby said secondary side, said third and fourth switches, and said output capacitive device are coupled to form a loop.

4. The power conversion topology according to claim 1 wherein: said third switch and said fourth switch are coupled in series between said first end of said secondary side and said output capacitive device; said cathodes of said third and fourth switches are coupled in the direction of said first end of said secondary side; and whereby said secondary side, said third and fourth switches, and said output capacitive device are coupled to form a loop.

5. The power conversion topology according to claim 1 wherein said diodes are integral with said switches.

6. The power conversion topology according to claim 1 wherein said diodes are external to said switches.

7. The power conversion topology according to claim 1 wherein said switches comprise MOSFET transistors.

8. The power conversion topology according to claim 1 wherein said switches comprise BJT transistors.

9. The power conversion topology according to claim 1 wherein said switches comprise IGBTs.

10. The power conversion topology according to claim 1 wherein said multi-winding inductor includes two windings on said primary side and one winding on said secondary side.

11. A non-linear power amplifier having four quadrant power supplying capability comprising:
(a) a four quadrant power conversion topology comprising a multi-winding inductor having a primary side and a secondary side, a first switch coupled to said primary side and having a diode coupled across said switch, a second switch coupled to said primary side and having a diode coupled across said switch, a third switch coupled to said secondary side and an output capacitive device and having a diode coupled across said switch, and a fourth switch coupled to said secondary side and an output capacitive device and having a diode coupled across said switch, said topology being operable to generate a positive voltage at said output capacitive device in response to said third switch being driven to a closed state, one of said first and second switches being driven to an open state and the other of said first and second switches being driven approximately synchronously with said fourth switch to opposite and alternating states, said topology also being operable to generate a negative voltage at said output capacitive device in response to said fourth switch being driven to a closed state, one of said first and second switches being driven to an open state and the other of said first and second switches being driven approximately synchronously with said third switch to opposite and alternating states, said topology also being operable to generate a zero voltage level; and
(b) a switch-control-signal generator coupled to said four quadrant power conversion topology, said switch-control-signal generator being configured to receive an input signal, said switch-control-signal generator being operative to generate in response to said input signal a first switch activation signal for driving said first switch, a second switch activation signal for driving said second switch, a third switch activation signal for driving said third switch, and a fourth switch activation signal for driving said fourth switch wherein said switch activation signals drives said topology to generate an output signal that amplifies said input signal.

12. The non-linear power amplifier according to claim 11 wherein said switch-control-signal generator is configured to receive a switching frequency signal, said switch-control-signal generator being operable in response to said switching frequency signal.

13. The non-linear power amplifier according to claim 12 further comprising a switching frequency modulator, said switching frequency modulator being operable to supply said switching frequency signal to said switch-control-signal generator.

14. The non-linear power amplifier according to claim 13 wherein said switching frequency modulator is operable to change said switch frequency signal from a first frequency to a second frequency in response to an input to said switching frequency modulator.

15. The non-linear power amplifier according to claim 14 wherein said input to said switching frequency modulator is a characteristic of said output of said four quadrant power conversion topology.

16. A linear power amplifier having four quadrant power supplying capability comprising:
(a) a four quadrant power conversion topology comprising a multi-winding inductor having a primary side and a secondary side, a first switch coupled to said primary side and having a diode coupled across said switch, a second switch coupled to said primary side and having a diode coupled across said switch, a third switch coupled to said secondary side and an output capacitive device and having a diode coupled across said switch, and a fourth switch coupled to said secondary side and an output capacitive device and having a diode coupled across said switch, said topology being operable to generate a positive voltage at said output capacitive device in response to said third switch being driven to a closed state, one of said first and second switches being driven to an open state and the other of said first and second switches being driven approximately synchronously with said fourth switch to opposite and alternating states, said topology also being operable to generate a negative voltage at said output capacitive device in response to said fourth switch being driven to a closed state, one of said first and second switches being driven to an open state and the other of said first and second switches being driven approximately synchronously with said third switch to opposite and alternating states, said topology also being operable to generate a zero voltage level;
(b) a switch-control-signal generator coupled to said four quadrant power conversion topology, said switch-control-signal generator being configured to receive an input signal, said switch-control-signal generator being operative to generate in response to said input signal a first switch activation signal for driving said first switch, a second switch activation signal for driving said second switch, a third switch activation signal for driving said third switch, and a fourth switch activation signal for driving said fourth switch;

(c) an output monitor coupled to said four quadrant power conversion topology and configured to receive said output signal from said output of said four quadrant power conversion topology, said output monitor being operative to generate an output monitor signal in response to said output signal; and (d) an error amplifier coupled to said output monitor and configured to receive said output monitor signal, said error amplifier being operative to generate a correction signal in response to said output monitor signal.

17. The linear power amplifier according to claim 16 wherein said switch-control-signal generator is configured to receive a switching frequency signal, said switch-control-signal generator being operable in response to said switching frequency signal.

18. The linear power amplifier according to claim 17 further comprising a switching frequency modulator, said switching frequency modulator being operable to supply said switching frequency signal to said switch-control-signal generator.

19. The linear power amplifier according to claim 18 wherein said switching frequency modulator is operable to change said switch frequency signal from a first frequency to a second frequency in response to an input to said switching frequency modulator.

20. The linear power amplifier according to claim 19 wherein said input to said switching frequency modulator is a characteristic of said output of said four quadrant power conversion topology.

21. A signal generator having four quadrant power supplying capability comprising:
(a) a waveform generator that is operable to generate a low power signal to be power amplified; and
(b) a linear power amplifier having four quadrant power supplying capability coupled to said waveform generator and that is configured to receive said low power signal, said linear power amplifier comprising:
(1) a four quadrant power conversion topology comprising a multi-winding inductor having a primary side and a secondary side, a first switch coupled to said primary side and having a diode coupled across said switch, a second switch coupled to said primary side and having a diode coupled across said switch, a third switch coupled to said secondary side and an output capacitive device and having a diode coupled across said switch, and a fourth switch coupled to said secondary side and an output capacitive device and having a diode coupled across said switch, said topology being operable to generate a positive voltage at said output capacitive device in response to said third switch being driven to a closed state, one of said first and second switches being driven to an open state and the other of said first and second switches being driven approximately synchronously with said fourth switch to opposite and alternating states, said topology also being operable to generate a negative voltage at said output capacitive device in response to said fourth switch being driven to a closed state, one of said first and second switches being driven to an open state and the other of said first and second switches being driven approximately synchronously with said third switch to opposite and alternating states, said topology also being operable to generate a zero voltage level; and (2) a switch-control-signal generator coupled to said four quadrant power conversion topology, said switch-control-signal generator being configured to receive said low power signal, said switch-control-signal generator being operative to generate in response to said low power signal a first switch activation signal for driving said first switch, a second switch activation signal for driving said second switch, a third switch activation signal for driving said third switch, and a fourth switch activation signal for driving said fourth switch.

22. A signal generator comprising:
(a) a four quadrant power conversion topology comprising a multi-winding inductor having a primary side and a secondary side, a first switch coupled to said primary side and having a diode coupled across said switch, a second switch coupled to said primary side and having a diode coupled across said switch, a third switch coupled to said secondary side and an output capacitive device and having a diode coupled across said switch, and a fourth switch coupled to said secondary side and an output capacitive device and having a diode coupled across said switch said topology being operable to generate a positive voltage at said output capacitive device in response to said third switch being driven to a closed state, one of said first and second switches being driven to an open state and the other of said first and second switches being driven approximately synchronously with said fourth switch to opposite and alternating states, said topology also being operable to generate a negative voltage at said output capacitive device in response to said fourth switch being driven to a closed state, one of said first and second switches being driven to an open state and the other of said first and second switches being driven approximately synchronously with said third switch to opposite and alternating states, said topology also being operable to generate a zero voltage level; and (b) synthesizer logic coupled to said power conversion topology, said synthesizer logic being operable to generate a first switch activation signal for driving said first switch, a second switch activation signal for driving said second switch, a third switch activation signal for driving said third switch, and a fourth switch activation signal for driving said fourth switch to drive said power conversion topology to generate a desired output signal.

23. The signal generator according to claim 22 wherein said output of said four quadrant power conversion topology drives a ringing load.

24. The signal generator according to claim 22 wherein said output of said four quadrant power conversion topology drives a shake table.

25. A non-linear power amplifier having four quadrant power supplying capability comprising:
(a) a four quadrant power conversion topology including a multi-winding inductor, a first switch with a diode coupled across said switch, a second switch with a diode coupled across said switch, a third switch with a diode coupled across said switch, and a fourth switch with a diode coupled across said switch;
(b) a switch-control-signal generator coupled to said four quadrant power conversion topology, said switchcontrol-signal generator being configured to receive an input signal, said switch-control-signal generator being operative to generate in response to said input signal a first switch activation signal for driving said first switch, a second switch activation signal for driving said second switch, a third switch activation signal for driving said third switch, and a fourth switch activation signal for driving said fourth switch, said switch-control-signal generator being configured to receive a switching frequency signal, said switch-control-signal generator being operable in response to said switching frequency signal;

(c) a switching frequency modulator, said switching frequency modulator being operable to supply said switching frequency signal to said switch-control-signal generator, said switching frequency modulator comprising a frequency modulated oscillator and an output current peak detector, said output current peak detector being configured to detect a current at said output of said four quadrant power conversion topology, said output current peak detector being operative to provide a signal to said frequency modulated oscillator indicative of the sensed output current, said frequency modulated oscillator being operable to change said switch frequency signal from a first frequency to a second frequency in response to said signal from said output current peak detector; and (d) whereby said four quadrant power conversion topology generates an output in response to actuation of at least one of said switches.

26. A non-linear power amplifier having four quadrant power supplying capability comprising:

(a) a four quadrant power conversion topology including a multi-winding inductor, a first switch with a diode coupled across said switch, a second switch with a diode coupled across said switch, a third switch with a diode coupled across said switch, and a fourth switch with a diode coupled across said switch;

(b) a switch-control-signal generator coupled to said four quadrant power conversion topology, said switch-control-signal generator being configured to receive an input signal, said switch-control-signal generator being operative to generate in response to said input signal a first switch activation signal for driving said first switch, a second switch activation signal for driving said second switch, a third switch activation signal for driving said third switch, and a fourth switch activation signal for driving said fourth switch, said switch-control-signal generator comprising:

a polarity detector configured to receive said input signal and being operable to detect the polarity of said input signal, said polarity detector being operable to produce a polarity signal in response to the detected polarity of said input signal;

a full-wave rectifier configured to receive said input signal, said full-wave rectifier being operable to full-wave rectify said input signal and to output a full-wave rectified signal;

a pulse-width-modulator coupled to said full-wave rectifier and being configured to receive said full-wave rectified signal, said pulse width modulator being operable to generate a pulse-width-modulated signal in response to said full-wave rectified signal; and steering logic coupled to said pulse-width modulator and said polarity detector, said steering logic being configured to receive said pulse-width-modulated signal and said polarity signal, said steering logic being operative to generate said switch activation signals in response to said pulse-width-modulated signal and said polarity signal; and (c) whereby said four quadrant power conversion topology generates an output in response to actuation of at least one of said switches.

27. A linear power amplifier having four quadrant power supplying capability comprising:

(a) a four quadrant power conversion topology including a multi-winding inductor, a first switch with a diode coupled across said switch, a second switch with a diode coupled across said switch, a third switch with a diode coupled across said switch, and a fourth switch with a diode coupled across said switch;

(b) a switch-control-signal generator coupled to said four quadrant power conversion topology, said switch-control-signal generator being configured to receive an input signal, said switch-control-signal generator being operative to generate in response to said input signal a first switch activation signal for driving said first switch, a second switch activation signal for driving said second switch, a third switch activation signal for driving said third switch, and a fourth switch activation signal for driving said fourth switch, said switch-control-signal generator being configured to receive a switching frequency signal, said switch-control-signal generator being operable in response to said switching frequency signal;

(c) whereby said four quadrant power conversion topology generates an output in response to actuation of at least one of said switches;

(d) an output monitor coupled to said four quadrant power conversion topology and configured to receive an output signal from said output of said four quadrant power conversion topology, said output monitor being operative to generate an output monitor signal in response to said output signal;

(e) an error amplifier coupled to said output monitor and configured to receive said output monitor signal, said error amplifier being operative to generate a correction signal in response to said output monitor signal; and (f) a switching frequency modulator, said switching frequency modulator being operable to supply said switching frequency signal to said switch-control-signal generator, said switching frequency modulator comprising a frequency modulated oscillator and an output current peak detector, said output current peak detector being configured to detect a current at said output of said four quadrant power conversion topology, said output current peak detector being operative to provide a signal to said frequency modulated oscillator indicative of the sensed output current, said frequency modulated oscillator being operable to change said switch frequency signal from a first frequency to a second frequency in response to said signal from said output current peak detector.

28. A linear power amplifier having four quadrant power supplying capability comprising:

(a) a four quadrant power conversion topology including a multi-winding inductor, a first switch with a diode coupled across said switch, a second switch with a diode coupled across said switch, a third switch with a diode coupled across said switch, and a fourth switch with a diode coupled across said switch;

(b) a switch-control-signal generator coupled to said four quadrant power conversion topology, said switchcontrol-signal generator being configured to receive an input signal, said switch-control-signal generator being operative to generate in response to said input signal a first switch activation signal for driving said first switch, a second switch activation signal for driving said second switch, a third switch activation signal for driving said third switch, and a fourth switch activation signal for driving said fourth switch, said switch-control-signal generator comprising:

a polarity detector configured to receive said input signal and being operable to detect the polarity of said input signal, said polarity detector being operable to produce a polarity signal in response to the detected polarity of said input signal;

a full-wave rectifier configured to receive said input signal, said full-wave rectifier being operable to full-wave rectify said input signal and to output a full-wave rectified signal;

a pulse-width-modulator coupled to said full-wave rectifier and being configured to receive said full-wave rectified signal, said pulse width modulator being operable to generate a pulse-width-modulated signal in response to said full-wave rectified signal; and steering logic coupled to said pulse-width modulator and said polarity detector, said steering logic being configured to receive said pulse-width-modulated signal and said polarity signal, said steering logic being operative to generate said switch activation signals in response to said pulse-width-modulated signal and said polarity signal;

(c) whereby said four quadrant power conversion topology generates an output in response to actuation of at least one of said switches;

(d) an output monitor coupled to said four quadrant power conversion topology and configured to receive an output signal from said output of said four quadrant power conversion topology, said output monitor being operative to generate an output monitor signal in response to said output signal; and (e) an error amplifier coupled to said output monitor and configured to receive said output monitor signal, said error amplifier being operative to generate a correction signal in response to said output monitor signal.

29. A power conversion topology having four quadrant power supplying capability comprising:

(a) a multi-winding inductor having a primary side and a secondary side, said primary side being coupled to an input terminal having a return end, said secondary side being coupled to an output capacitive device, said primary side having a first end, a center tap, and a second end, said secondary side having a first end and a second end;

(b) a first switch coupled between said return end of said input terminal and said first end of said primary side, said first switch including a first diode coupled across said first switch, said first diode having a cathode;

(c) a second switch coupled between said return end of said input terminal and said second end of said primary side, said second switch including a second diode coupled across said second switch, said second diode having a cathode;

(d) a third switch and a fourth switch coupled in a loop with said secondary side and said output capacitive device, said third switch including a third diode coupled across said third switch, said third diode having a cathode, said fourth switch including a fourth diode coupled across said fourth switch, said fourth diode having a cathode; and (e) the topology being capable of bi-directional current output, the topology also being operable to generate a positive voltage at said output capacitive device in response to said third switch being driven to a closed state, one of said first and second switches being driven to an open state and the other of said first and second switches being driven approximately synchronously with said fourth switch to opposite and alternating states, the topology also being operable to generate a negative voltage at said output capacitive device in response to said fourth switch being driven to a closed state, one of said first and second switches being driven to an open state and the other of said first and second switches being driven approximately synchronously with said third switch to opposite and alternating states.

30. The topology according to claim 1 wherein: the topology is operable to generate a positive voltage at said output capacitive device in response to said third switch being driven to a closed state, one of said first and second switches being driven to an open state and the other of said first and second switches being driven approximately synchronously with said fourth switch to opposite and alternating states; and the topology is operable to generate a negative voltage at said output capacitive device in response to said fourth switch being driven to a closed state, one of said first and second switches being driven to an open state and the other of said first and second switches being driven approximately synchronously with said third switch to opposite and alternating states.

31. The power conversion topology according to claim 1 wherein said cathode of said first diode is coupled to said first end of said primary side and said cathode of said second diode is coupled to said second end of said primary side.

32. The power conversion topology according to claim 1 wherein a voltage differential is applied across said supply end and said return end of said input terminal and the voltage level at said supply end is more positive than the voltage level at said return end.

33. The power conversion topology according to claim 1 wherein a voltage differential is applied across said supply end and said return end of said input terminal and the voltage level at said supply end is more negative than the voltage level at said return end.

34. The power conversion topology according to the claim 33 wherein said cathode of said first diode and said cathode of said second diode are coupled to said return end of said input terminal.

35. The power conversion topology according to claim 1 wherein:

(a) said fourth switch is coupled between said first end of said secondary side and a first end of said output capacitive device, said fourth switch being operative to disconnect said first end of said secondary side from said first end of said output capacitive device when said fourth switch is in an open state; and (b) said third switch is coupled between said second end of said secondary side and a second end of said output capacitive device, said third switch being operative to disconnect said second end of said secondary side from said second end of said output capacitive device when said third switch is in an open state.

36. The topology according to claim 1 wherein said topology is operable to generate an AC voltage output in response to the actuation of a plurality of said switches.

37. The power conversion topology according to claim 2 wherein:

said cathode of said third switch is coupled to said first end of said secondary side; and said cathode of said fourth switch is coupled to said second end of said secondary side.

38. The non-linear power amplifier according to claim 13 wherein said switching frequency modulator comprises a frequency modulated oscillator and an output current peak detector, said output current peak detector being configured to detect a current at said output of said four quadrant power conversion topology, said output current peak detector being operative to provide a signal to said frequency modulated oscillator indicative of the sensed output current, said frequency modulated oscillator being operable to change said switch frequency signal from a first frequency to a second frequency in response to said signal from said output current peak detector.

39. The non-linear power amplifier according to claim 11 wherein said switch-control-signal generator comprises:

a polarity detector configured to receive said input signal and being operable to detect the polarity of said input signal, said polarity detector being operable to produce a polarity signal in response to the detected polarity of said input signal;

a full-wave rectifier configured to receive said input signal, said full-wave rectifier being operable to full-wave rectify said input signal and to output a full-wave rectified signal;

a pulse-width-modulator coupled to said full-wave rectifier and being configured to receive said full-wave rectified signal, said pulse width modulator being operable to generate a pulse-width-modulated signal in response to said full-wave rectified signal; and steering logic coupled to said pulse-width modulator and said polarity detector, said steering logic being configured to receive said pulse-width-modulated signal and said polarity signal, said steering logic being operative to generate said switch activation signals in response to said pulse-width-modulated signal and said polarity signal.

40. The non-linear power amplifier according to claim 11 wherein said input signal is an AC signal and said switch-control-generator is operative to generate said switch activation signals that drive said switches to cause said topology to generate an AC output signal having a higher power content than said input AC signal.

41. The non-linear power amplifier according to claim 11 wherein said input signal is a DC signal and said switch-control-generator is operative to generate said switch activation signals that drive said switches to cause said topology to generate a DC output signal having a higher power content than said input DC signal.

42. The non-linear power amplifier according to claim 15 wherein said characteristic is the current level at said output capacitive device.

43. The linear power amplifier according to claim 18 wherein said switching frequency modulator comprises a frequency modulated oscillator and an output current peak detector, said output current peak detector being configured to detect a current at said output of said four quadrant power conversion topology, said output current peak detector being operative to provide a signal to said frequency modulated oscillator indicative of the sensed output current, said frequency modulated oscillator being operable to change said switch frequency signal from a first frequency to a second frequency in response to said signal from said output current peak detector.

44. The linear power amplifier according to claim 16 wherein said switch-control-signal generator comprises:

a polarity detector configured to receive said input signal and being operable to detect the polarity of said input signal, said polarity detector being operable to produce a polarity signal in response to the detected polarity of said input signal;

a full-wave rectifier configured to receive said input signal, said full-wave rectifier being operable to full-wave rectify said input signal and to output a full-wave rectified signal;

a pulse-width-modulator coupled to said full-wave rectifier and being configured to receive said full-wave rectified signal, said pulse width modulator being operable to generate a pulse-width-modulated signal in response to said full-wave rectified signal; and steering logic coupled to said pulse-width modulator and said polarity detector, said steering logic being configured to receive said pulse-width-modulated signal and said polarity signal, said steering logic being operative to generate said switch activation signals in response to said pulse-width-modulated signal and said polarity signal.

45. The linear power amplifier according to claim 16 wherein said input signal is an AC signal and said switch-control-generator is operative to generate said switch activation signals that drive said switches to cause said topology to generate an AC output signal having a higher power content than said input AC signal.

46. The linear power amplifier according to claim 16 wherein said input signal is a DC signal and said switch-control-generator is operative to generate said switch activation signals that drive said switches to cause said topology to generate a DC output signal having a higher power content than said input DC signal.

47. The linear power amplifier according to claim 20 wherein said characteristic is the current level at said output capacitive device.

48. The signal generator according to claim 21 further comprising a switching frequency modulator and wherein:

said switch-control-signal generator is configured to receive a switching frequency signal, said switch-control-signal generator being operable in response to said switching frequency signal;

said switching frequency modulator is operable to supply said switching frequency signal to said switch-control-signal generator; and said switching frequency modulator comprises a frequency modulated oscillator and an output current peak detector, said output current peak detector being configured to detect a current at said output of said four quadrant power conversion topology, said output current peak detector being operative to provide a signal to said frequency modulated oscillator indicative of the sensed output current, said frequency modulated oscillator being operable to change said switch frequency signal from a first frequency to a second frequency in response to said signal from said output current peak detector.

49. The signal generator according to claim 21 wherein said switch-control-signal generator comprises:

a polarity detector configured to receive said input signal and operable to detect the polarity of said input signal, said polarity detector being operable to produce a polarity signal in response to the detected polarity of said input signal;

a full-wave rectifier configured to receive said input signal, said full-wave rectifier being operable to full-wave rectify said input signal and to output a full-wave rectified signal;

a pulse-width-modulator coupled to said full-wave rectifier and being configured to receive said full-wave rectified signal, said pulse width modulator being operable to generate a pulse-width-modulated signal in response to said full-wave rectified signal; and steering logic coupled to said pulse-width modulator and said polarity detector, said steering logic being configured to receive said pulse-width-modulated signal and said polarity signal, said steering logic being operative to generate said switch activation signals in response to said pulse-width-modulated signal and said polarity signal.

50. The signal generator according to claim 22 further comprising a switching frequency modulator and wherein:

said switch-control-signal generator is configured to receive a switching frequency signal, said switch-control-signal generator being operable in response to said switching frequency signal;

said switching frequency modulator is operable to supply said switching frequency signal to said switch-control-signal generator; and said switching frequency modulator comprises a frequency modulated oscillator and an output current peak detector, said output current peak detector being configured to detect a current at said output of said four quadrant power conversion topology, said output current peak detector being operative to provide a signal to said frequency modulated oscillator indicative of the sensed output current, said frequency modulated oscillator being operable to change said switch frequency signal from a first frequency to a second frequency in response to said signal from said output current peak detector.

51. The signal generator according to claim 22 wherein said switch-control-signal generator comprises:

a polarity detector configured to receive said input signal and operable to detect the polarity of said input signal, said polarity detector being operable to produce a polarity signal in response to the detected polarity of said input signal;

a full-wave rectifier configured to receive said input signal, said full-wave rectifier being operable to full-wave rectify said input signal and to output a full-wave rectified signal;

a pulse-width-modulator coupled to said full-wave rectifier and being configured to receive said full-wave rectified signal, said pulse width modulator being operable to generate a pulse-width-modulated signal in response to said full-wave rectified signal; and steering logic coupled to said pulse-width modulator and said polarity detector, said steering logic being configured to receive said pulse-width-modulated signal and said polarity signal, said steering logic being operative to generate said switch activation signals in response to said pulse-width-modulated signal and said polarity signal.

52. A method of providing a four quadrant power source comprising the steps of:

(a) providing a four quadrant power conversion topology comprising: a multi-winding inductor having a primary side and a secondary side; a first switch coupled to said primary side and having a diode coupled across said switch; a second switch coupled to said primary side and having a diode coupled across said switch; a third switch coupled to said secondary side and an output capacitive device and having a diode coupled across said switch; and a fourth switch coupled to said secondary side and said output capacitive device and having a diode coupled across said switch;

(b) generating a positive voltage with said topology by driving said third switch to a closed state, driving one of said first and second switches to an open state, and driving the other of said first and second switches approximately synchronously with said fourth switch to opposite and alternating states; and (c) generating a negative voltage with said topology by driving said fourth switch to a closed state, driving one of said first and second switches to an open state, and driving the other of said first and second switches approximately synchronously with said third switch to opposite and alternating states.

* * * * *